J. E. BRANIN.
PIPE CLAMP.
APPLICATION FILED AUG. 13, 1919.

1,343,548.

Patented June 15, 1920.

INVENTOR
John E. Branin.
BY Strong & Townsend
ATTORNEYS

UNITED STATES PATENT OFFICE.

JOHN E. BRANIN, OF SAN LORENZO, CALIFORNIA.

PIPE-CLAMP.

1,343,548.  Specification of Letters Patent.  Patented June 15, 1920.

Application filed August 13, 1919. Serial No. 317,191.

*To all whom it may concern:*

Be it known that I, JOHN E. BRANIN, a citizen of the United States, residing at San Lorenzo, in the county of Alameda and State of California, have invented new and useful Improvements in Pipe-Clamps, of which the following is a specification.

This invention relates to a device employed for lowering, raising or pulling well tubing, and more particularly to a clamp commonly termed a casing or tubing elevator.

One of the objects of the present invention is to provide a simple, substantial, cheaply manufactured clamp of the character described, which is so constructed that it may be rigidly secured to the tube when in use and quickly applied or removed whenever desired. Another object of the invention is to provide a clamp wherein are mounted removable jaws, said jaws permitting adjustment of the clamp and handling of casing or tubing of varying diameters. Another object of the invention is to provide a bail-like member, whereby the clamp and tubing carried thereby may be raised and lowered; and furthermore to reinforce the clamp against forces which tend to strain and separate the clamp sections. Further objects will hereinafter appear.

Having reference to the accompanying drawings.

Figure 1:
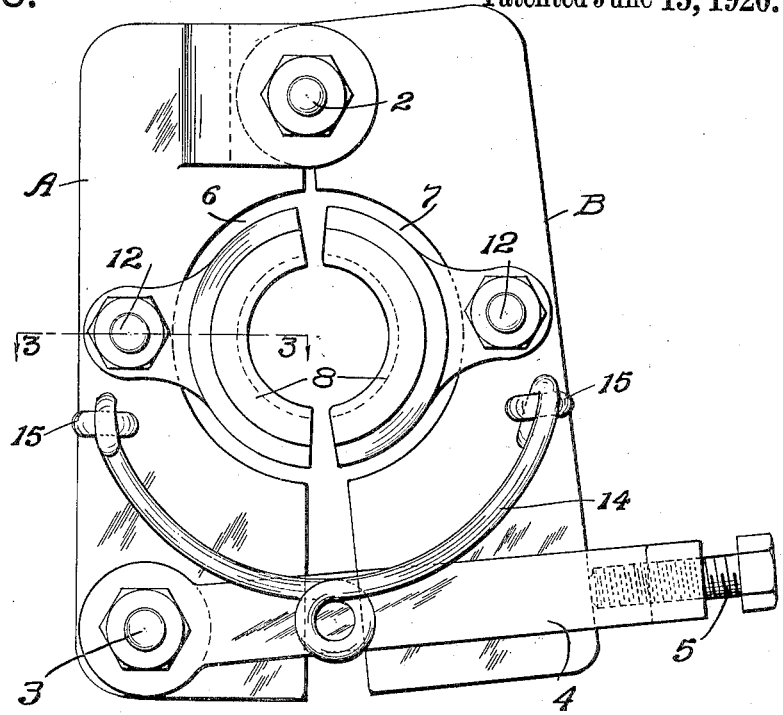
Figure 1 is a plan view of the clamp.

Referring to the drawings in detail, A and B indicate a pair of clamp sections which are hingedly connected at one end, as shown at 2. Pivotally attached to the clamp section A, as shown at 3, is a fork-shaped locking lever 4, in the outer end of which is mounted a clamp screw 5.

Figure 2:
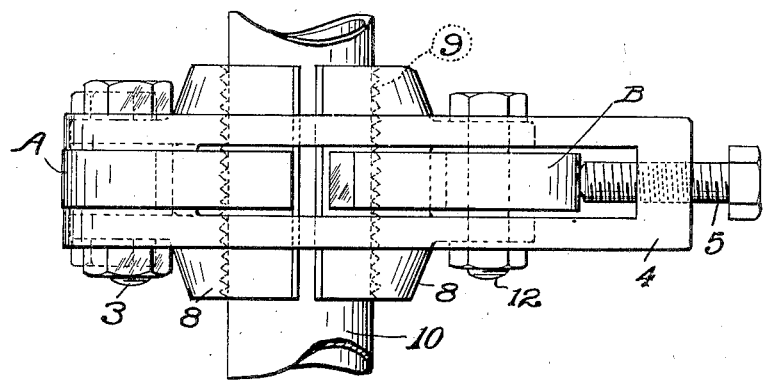
Fig. 2 is a side elevation of the same.
Figure 3:
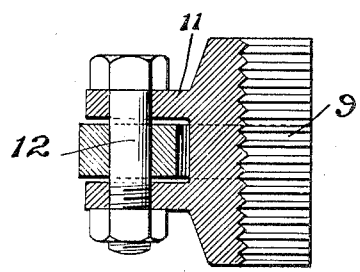
Fig. 3 is a cross section taken on the line 3—3 of Fig. 1.

Formed intermediate the ends of the clamp sections A and B are a pair of recesses, such as shown at 6 and 7. These recesses are formed for the reception of a pair of clamp sections 8, the inner faces of said sections being corrugated or provided with annular teeth 9, as shown in Figs. 2 and 3, to permit a rigid grip on the well tubing or casing, generally indicated at 10. The gripping clamps 8 are removable with relation to the main clamps A and B; that is, each clamp is provided with a fork-shaped lug 11, said lugs being perforated for the reception of a bolt 12 which secures each section with relation to its coöperating main clamp and also serves as a pivotal mounting for the gripping clamps.

In actual operation I employ the clamp for raising, lowering, pulling and for otherwise handling well tubing or casing. If it is desired to apply the clamp it is only necessary to swing the locking lever 4 clear of the clamp section B. The sections of the clamp may then be opened out and placed in position on the tubing so that the gripping clamps 8 will engage the same. The main clamp sections A and B, together with the gripping clamps 8 carried thereby, are then brought together and the locking lever swung into engagement with the clamp section B. The several clamp sections are then drawn tightly together by means of the screw 5. The well tubing may then be handled as desired by means of a bail, such as shown at 14; this bail being pivotally attached to the clamp sections A and B, as shown at 15.

From the foregoing description it will be seen that I have provided; first, a tubing clamp which may be adjusted to suit varying sizes, that is, it is possible to insert gripping clamps of varying sizes to suit different tubing; second, a clamp that may be rigidly secured, when in use, and quickly applied or removed whenever desired as it is only necessary to release the locking lever 4; third, that the clamp as constructed is rigid and substantial, due to the fact that the locking lever, together with the hinge lugs 2 employed, supports the clamp sections against lateral movement with relation to each other, for instance, when lifting or lowering the tubing; and, fourth, that a perfect engagement of the gripping clamps with relation to the tubing is always obtained as these lugs are pivotally mounted on the bolts 12.

While a more or less specific structure is here shown, I wish it understood that the materials and finish of the several parts herein employed may be such as the experience and judgment of the manufacturer may dictate, and also that various changes in the design and proportions may be resorted to within the scope of the appended claims.

Having thus described my invention, what I claim and desire to secure by Letters Patent is—

1. In a pipe clamp, a pair of hingedly connected clamping sections having mating semi-circular recesses, an arcuate gripping jaw for each section having its rear side face curved and disposed adjacent the inner side of the section, a radial forked part extending outwardly from said curved rear side of the jaw at the center of the latter, said forked part engaging the upper and lower faces of the section, a bolt extended through the forked part and through the section to removably and pivotally connect the jaw to the sections, and means to lock the sections against movement about the hinge thereof, the curved rear side faces of the jaws being arranged adjacent to the walls formed by the semi-circular recesses of the clamping sections so that said walls will restrict pivotal movement of the jaws.

2. In a pipe clamp, a pair of hingedly connected clamping sections, an arcuate gripping jaw for each section having its rear side spaced from the inner side of the section, and engageable therewith a central part extending outwardly from said rear side of the jaw, a bolt passed through the section and said part to removably and pivotally connect the jaw to the section and means to lock the sections against movement about the hinge thereof.

In testimony whereof I have hereunto set my hand in the presence of two subscribing witnesses.

JOHN E. BRANIN.

Witnesses:
H. F. SCHLUETER,
W. Z. SMITH.